3,156,709
OXIDATION PROCESS
George Graham Allan, Buffalo, N.Y., assignor to E. I. du Pont de Nemours and Company, Wilmington, Del., a corporation of Delaware
No Drawing. Filed Mar. 6, 1962, Ser. No. 177,725
7 Claims. (Cl. 260—348.5)

This invention relates to the oxidation of ethylenic compounds and, more particularly, to the catalysis of the oxidation of such compounds with hydrogen peroxide to obtain epoxides and/or polyhydroxy compounds.

The oxidation of ethylenic compounds with organic peracids to yield epoxides and/or polyhydroxy compounds is well known. The production of such oxidation products by reactions of various ethylenic compounds and hydrogen peroxide in the presence of catalysts which are inorganic compounds of metals such as Os, Ti, Zr, Th, V, Nb, Ta, Cr, Mo, W, U, Ru, and Se, has been reported in the chemical literature. However, use of such catalysts has not been very practical for various reasons. In the first place, they are expensive, and because they are expensive their recovery has been considered essential. However, the usual methods for recovering them in reusable form are generally cumbersome and costly, particularly when relatively high catalyst concentrations are required. Product contamination by the catalyst has also been a troublesome problem.

It is an object of the invention to provide an improved method for catalyzing the oxidation of ethylenic compounds with hydrogen peroxide. A further object is an improved method for epoxidizing and/or hydroxylating ethylenic compounds with hydrogen peroxide in the presence of catalysts which are compounds of metals of the type mentioned above. A particular object is an improved method for effecting the catalytic epoxidation and/or hydroxylation with hydrogen peroxide of ethylenic compounds having electronegatively substituted double bonds. Another object is the provision of new epoxides which are readily obtained by the method of my invention. Still further objects will be apparent from the following description.

The objects of the invention are accomplished by effecting the liquid phase oxidation of ethylenic compounds with hydrogen peroxide in the presence of a catalyst which is an insoluble organometallic compound of a metal of the type mentioned above. Any insoluble organometallic compound which is a compound of any of the metals whose inorganic compounds (usually the oxide, acid or peracid) were known heretofore to catalyze the oxidation of ethylenic compounds with hydrogen peroxide, can be employed in practicing the method of the invention. Illustrative of the metals whose insoluble organic compounds are usable for the present purpose are: tungsten, vanadium, molybdenum, uranium, niobium, osmium, chromium, tantalum, selenium, cerium, ruthenium, titanium, zirconium, and thorium. However, the insoluble organometallic compounds of tungsten, molybdenum, uranium, niobium, and osmium constitute the preferred catalysts; and of these, the tungsten compounds are most preferred because of their generally superior efficiency.

As indicated, the organometallic compounds employed as the catalysts should be insoluble in the reaction mixture and the reaction products. By virtue of that insolubility, the catalyst can be easily separated, e.g. by filtration, decantation or other mechanical separation methods, from the reaction mixture. This ease of separation greatly simplifies the problem of obtaining product uncontaminated by the catalyst and the separated catalyst is immediately available for reuse. The insoluble catalyst can be employed in large amounts or concentrations where necessary to increase reaction rate, without creating special or burdensome catalyst separation problems.

The metal portion of the organometallic compound catalyst may be attached to the organic portion of the compound by any type of bonding, e.g. by ionic-, covalent-, coordinate- or pi-bonding, the only requirement being that the attachment be sufficiently strong to prevent separation of the metal portion from the organic portion under the conditions of use.

The preferred organometallic compounds are those having polymeric structures. The metal may be an integral part of the polymer chain but preferably it will be incorporated in pendant groups, e.g. recurring substituent or side groups on the polymer chain. Most preferably, the catalyst will be a salt of the metal and an anion exchange resin. The most preferred resins of this type are the well-known and commercially-available quaternary ammonium resins formed by the amination with a tertiary amine of a chloromethylated copolymer of styrene and divinylbenzene, as described in McBurney U.S.P. 2,591,573. Similar basic ion exchange resins formed similarly but employing dimethylethanolamine as the aminating agents are also suitable. Commercially-available resins of the above preferred type are, respectively, "Amberlite" IRA–400 and 410, sold by the Rohm and Haas Company.

The insoluble organometallic compound catalyst can be in the form of a chelate. The chelate may be that of the chosen metal with a monomeric organic chelate-forming compound such as 8-hydroxyquinoline. Generally, it is preferred that such chelate be a polymeric chelate, i.e. a chelate of the chosen metal and a chelate-forming polymer which will form the backbone for the retention of the metal atoms.

The polymeric portion of the chelate complex can be any polymer which is inert and insoluble in the ethylenic compound-$H_2O_2$ reaction system and which has at least one, and preferably recurring, metal chelate-forming structures, i.e., a structure which contains at least two donor groups so located with respect to each other that they form a chelate ring with the metal. Well known donor groups are those containing oxygen, sulfur or nitrogen atoms as donor atoms, in carboxy, hydroxy (enolic, alcoholic or phenolic) or carbonyl; amino (primary, secondary or tertiary), imino or hydroxyimino; or thio, mercapto or sulfo, groups. As is well known, some of these groups form covalent bonds while others form coordinate bonds with the metal atom in forming the chelate ring. In chelate polymers, the metal atoms are generally in a positive state of valence.

Illustrative of suitable chelate-forming polymers (addition or condensation polymers) are the tropolone-formaldehyde polymers, salicylic acid-formaldehyde polymers, resorcylic acid-formaldehyde polymers, polymeric 1,2-dioximes and 1,2-ketoximes, polythiosemicarbazides, substituted styrene polymers containing aliphatic aminocarboxylic acid groups, polymeric alkyl 3-keto-4-pentenoates and poly (4-[bis (carboxymethyl)-aminomethyl] styrene). The last named polymer, known as "Dowex" A–1 chelating polymer, is sold commercially by Dow Chemical Company.

Some of the organometallic catalysts are more effective than others but their effectiveness will depend somewhat upon the particular oxidation reaction which is to be catalyzed. In general, those catalysts which are salts of strongly basic anion exchange resins such as "Amberlite" IRA–400 and metals such as tungsten, vanadium, molybdenum, uranium, niobium and osmium constitute a preferred class. Of these, the acid tungstate salts of such strongly basic anion exchange resins are the most preferred.

The catalyst will, of course, be used in a form which is readily separated from the reaction mixture. In general, it should be in a granular form facilitating separation by filtration, centrifuging or similar mechanical separating methods. A granular form corresponding to 20 to 300 mesh size is generally satisfactory, a mesh size range of about 40 to 200 mesh (U.S. Standard Screen Scale) being generally preferred.

The present insoluble organometallic catalysts can be employed to catalyze any of the oxidations of ethylenic compounds with hydrogen peroxide which were heretofore known to be catalyzed by the prior inorganic compound catalysts (e.g. the oxides, acids or peracids) of the corresponding metals. Some such reactions yield epoxides, others yield polyhydroxy compounds (hydroxylated derivatives) while still others yield both types of products. In general, the type of product will be the same as that obtained when using corresponding inorganic catalysts under similar reaction conditions. As with the prior inorganic catalysts, the present catalysts are especially useful in aqueous systems involving oxidations of compounds having electronegatively substituted double bonds. A preferred group of such ethylenic compound reactants are those which are soluble to an appreciable extent in water. These include allyl alcohol and the alpha, beta ethylenic acids such as maleic acid, fumaric acid, citraconic acid, aconitic acid, itaconic acid, crotonic acid, methacrylic acid, acrylic acid, maleamic acid, N-carbamylmaleamic acid, and the alkyl hydrogen maleates and fumarates.

The epoxides of the alkyl hydrogen maleates, i.e. the alkyl hydrogen cis-epoxysuccinates, are new compounds which are valuable for use as cross linking agents for polyamide resins and as stabilizers for polyvinyl chloride resins. For such uses, the alkyl hydrogen epoxysuccinates of the lower alkanols of one to four carbon atoms, and their alkali metal salts are particularly useful and are preferred. The structural formula of these new compounds is

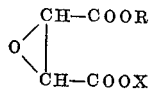

wherein R is an alkyl radical having from 1 to 4 carbon atoms and X is from the group consisting of hydrogen and the alkali metals.

In general, reaction conditions such as proportions of the reactants and temperature and pH of the reaction mixture will be essentially the same when using the present catalysts as when carrying out the same reactions employing the prior corresponding inorganic catalysts.

The invention is illustrated by the following examples in which all parts and composition percentages are by weight.

*Example 1*

A solution of sodium tungstate dihydrate (100 g.) in water (500 ml.) was adjusted to pH 5 by the addition thereto of a cation exchange resin (H+ form) which was a sulfonated copolymer of styrene and divinyl benzene. The solution was filtered and the filtrate was stirred overnight with the chloride form of a commercial quaternary ammonium anion exchange resin, "Amberlite" IRA–400 (200 ml.) which had been adjusted to pH 5 using hydrochloric acid. The resin was then collected and washed with distilled water until the washings gave a negative test for tungsten when tested by the method described in Vogel's "Qualitative Chemical Analysis," page 429 (1947), Longmans, Green & Co., London. The tungsten content of the washed resin corresponded to 38% tungstic oxide.

The hydrogen tungstate resin obtained by equilibrating the "Amberlite" IRA–400 resin with sodium hydrogen tungstate as described above was used repeatedly to catalyze the epoxidation of maleic acid with hydrogen peroxide to obtain disodium cis-epoxysuccinate in quantitative yield. In the first few uses of the same portion of the catalyst, the epoxide product obtained after filtering off the catalyst was contaminated somewhat with tungsten, apparently due to release to the reaction mixture of small amounts of tungsten which had been only physically adsorbed by the resin. However, after the first few such uses, further repeated reuse of the catalyst gave tungsten-free product in quantitative yields.

In a typical experiment, a solution of maleic acid (116 g., 1 mole) in water (350 ml.) was treated with a solution of sodium hydroxide (60 g., 1.5 mole) in water (100 ml.) so that the temperature rose to 70° C. and the pH of the resulting solution was about 5. The above resin-hydrogen tungstate catalyst (500 ml.) was added to the solution with stirring until the temperature fell to 45° C. Stirring was continued while aqueous 30% hydrogen peroxide (120 ml., 1.18 mole) was added. An exotherm usually occurred. The temperature was maintained at 60°–65° C. during the reaction period of 1.5 hrs., either by the application of heat or cooling, as became necessary. The reaction mixture was maintained at about pH 5 during the reaction period by the addition over the period of a solution of sodium hydroxide (20 g., 0.5 mole) in water (50 ml.). The catalyst was recovered for reuse simply by filtration and washing with hot water. Evaporation of the filtrate gave tungsten-free disodium cis-epoxysuccinate. The epoxide oxygen content of the product was 8.7% (as determined using standard hydrochloric acid saturated with magnesium chloride according to the Method of Payne, J. Org. Chem., 24, 54 (1959)), compared with the theoretical value of 9.1% for disodium epoxysuccinate.

When maleamic acid and lithium hydroxide were substituted, respectively, for maleic acid and sodium hydroxide in the above procedure, a lithium 2,3-epoxy-3-carboxamido propionate product containing 4.74% oxirane oxygen was obtained. The theoretical value for this salt is 11.7%. N-carbamylmaleamic acid was epoxidized in the same way.

*Example 2*

A chelate complex of tungsten and 8-hydroxy-quinoline was prepared by the method described in Vogel's "Quantitative Inorganic Analysis," page 576 (1948), Longmans, Green & Co., London; and an analogous method, described in Welcher's "Organic Analytical Reagents," vol. I, page 299 (1947), D. Van Nostrand Co., Inc., New York, was used to prepare a polymeric 8-hydroxyquinoline-tungsten chelate complex containing the equivalent of 8.15% $WO_3$. These chelates, and also the tungsten chelate of "Dowex" A–1 chelating polymer were employed to catalyze the epoxidation of maleic acid using the procedure of Example 1. The 8-hydroxyquinoline monomeric and polymeric chelates gave products containing, respectively, 2.5% and 4.5% oxirane oxygen. The chelate of the "Dowex" A–1 polymer gave a product containing 8.6% oxirane oxygen.

*Example 3*

The general procedure of Example 1 for preparing the hydrogen tungstate salt of "Amberlite" IRA–400 quaternary ammonium resin was employed to obtain a catalyst which was a vanadate salt of the resin. Sodium orthovanadate was used as the vanadium source in the preparation. The catalyst contained vanadium equivalent to 21.9% $V_2O_5$. A vanadium chelate catalyst containing the equivalent of 29.3% $V_2O_5$ was prepared by treating "Dowex" A–1 chelating resin (200 ml.) with a solution of vanadyl chloride (10 g.) in distilled water (100 ml.) at pH 3.

The above vanadate salt of the resin, when tested as catalyst in the epoxidation procedure of Example 1, gave a product containing 5.3% oxirane oxygen, while the vanadate chelate catalyst gave a product containing 0.5% oxirane oxygen.

Example 4

A solution of sodium molybdate dihydrate (200 g., 0.83 mole) in distilled water (1000 ml.) was adjusted to pH 5 and equilibrated with "Amberlite" IRA-400 quaternary ammonium resin following the general procedure of Example 1 for preparing the tungstate salt catalyst to obtain a corresponding molybdate salt of the resin. The molybdenum content of the resulting catalyst was equivalent to 23.2% $MoO_3$. When evaluated in the epoxidation procedure of Example 1, this catalyst gave a product containing 7.7% oxirane oxygen.

Example 5

A uranium chelate catalyst containing the equivalent of 45% $U_3O_8$ was prepared by treating "Dowex" A-1 chelating resin with a solution of uranyl acetate, following the procedure indicated in Example 3 for preparing the corresponding vanadium chelate catalyst. This uranium chelate also catalyzed the epoxidation of maleic acid when evaluated by the method of Example 1, but less effectively than did the catalyst of Example 1 since the product contained only 0.6% oxirane oxygen.

Example 6

A solution (pH 12.5) of osmium tetroxide (5 g.) and sodium hydroxide (0.8 g.) in water (100 ml.) was stirred with "Amberlite" IRA-400 quaternary ammonium resin (30 ml.). The pH remained the same and the resin beads turned black, probably due to partial oxidation of the resin. The treated resin catalyzed the epoxidation of maleic acid when evaluated by the method of Example 1, giving a product which was 32% epoxidized. The reaction was very vigorous with this catalyst apparently due to simultaneous catalysis of the decomposition of $H_2O_2$ and the occurrence of side reactions.

Potassium osmiamate, $KNOsO_3$, prepared by the method of Joly, Compt. rend., 112, 1442 (1891), was used to catalyze the epoxidation of maleic acid by the method of Example 1. A violent exotherm occurred and the product isolated was 16% epoxidized.

A solution of potassium osmiamate (2 g.) in water (10 ml.) was equilibrated with "Amberlite" IRA-400 quaternary ammonium resin (30 ml.) to obtain a blackened osmium-containing resin. When this material was used to catalyze the epoxidation of maleic acid in the method of Example 1, the isolated product was 37% epoxidized.

Example 7

The method of Example 1 was repeated employing citraconic acid (α-methylmaleic acid, 43 g., 0.33 mole) in place of maleic acid. The reaction was vigorous. The disodium α-methylepoxysuccinate product (56 g., 90% yield) was a light tan powder. Its oxirane oxygen content was 8.2% (theory=8.4%).

Example 8

The method of Example 1 was repeated employing aconitic acid (α-carboxymethylmaleic acid, 17.4 g., 0.1 mole) in place of maleic acid. The trisodium (α-carboxymethyl) epoxysuccinate product was a sticky solid containing 4.7% oxirane oxygen (theory=6.3%).

Example 9

The method of Example 1 was repeated employing itaconic acid (43 g., 0.33 mole) in place of maleic acid. A sticky product was obtained. It contained 10% of the theoretical oxirane oxygen content (8.45%) of disodium 3-carboxy-3,4-epoxybutyrate. When the experiment was repeated in the presence of a small amount of hydroquinone, the product was nonsticky and contained 35% of the theoretical oxirane oxygen content.

Example 10

When methacrylic acid (43 g., 0.5 mole) was used in place of maleic acid in the method of Example 1, sodium (α-methyl) epoxypropionate was obtained containing 8.5% oxirane oxygen (theory=12.9%).

Example 11

When fumaric acid was used in place of maleic acid in the method of Example 1, a disodium trans-epoxysuccinate product having an oxirane oxygen content equal to 75% of the theoretical value was obtained.

Example 12

Potassium ethyl maleate (36.4 g., 0.2 mole) was epoxidized by the general method of Example 1 to obtain a potassium ethyl cis-epoxysuccinate product having an oxirane oxygen content equal to 86% of the theoretical value.

The above potassium salt can be converted to the barium compound by adding a solution of the former to a half molar equivalent of barium chloride dissolved in hot water and filtering off the barium compound formed. The parent acid compound, ethyl hydrogen epoxy-succinate, can be obtained by treating a suspension of the barium compound and anhydrous magnesium sulfate in ether with an equivalent amount of an ether solution of sulfuric acid, filtering off the precipitated barium sulfate and removing ether from the filtrate under vacuum.

Potassium methyl, propyl and butyl hydrogen maleates may be epoxidized in a similar way to obtain the corresponding potassium alkyl cis-epoxysuccinates which may be converted to the parent acids in the manner indicated above.

These alkyl hydrogen epoxysuccinates are useful as stabilizers for halogen-containing resins such as polyvinyl chloride resins to improve their stability towards heat and light. They are also useful as agents for crosslinking or insolubilizing alcohol-soluble interpolyamides of the type disclosed in Brubaker et al., U.S.P. 2,285,009. Thus, a methanol solution of an interpolyamide formed from caprolactam, hexamethylenediammonium adipate and hexamethylenediammonium sebacate as described in the patent can be mixed with a methanol solution of ethyl hydrogen epoxysuccinate to obtain a mixture useful as a thermosetting adhesive. Setting may be effected by heating at elevated temperatures.

Example 13

A mixture of allyl alcohol (87 g., 1.5 mole), aqueous 30% hydrogen peroxide (115 ml., 1.13 mole) and water (500 ml.) was stirred with the hydrogen tungstate resin salt catalyst (400 ml.) of Example 1 for 2 hrs. at 60° C. and then overnight at room temperature. Dilution of the reaction mixture with water followed by extraction with ether gave an extract which contained both allyl alcohol and glycidol. The extracted reaction mixture was distilled to obtain a viscous residue, which upon further distillation gave glycerol, identified its IR-spectra, and another high boiling material with a spectra similar to that of glycerol. The latter material may have been glycerol allyl ether.

Example 14

Maleic anhydride (24.5 g., 0.25 mole) was dissolved in water (50 ml.), heated with aqueous 50% hydrogen peroxide (10 ml., 0.25 mole) and stirred with the hydrogen tungstate resin salt catalyst (100 ml.) of Example 1 at 80° C. for 2.5 hrs. The pH was 1.0. After filtering off the catalyst, concentration of the filtrate yielded racemic tartaric acid (21.3 g., 0.142 mole, 57% yield), M.P. 205° C.

Example 15

Tungsten-containing heteropoly acids of the formulas (a) $H_5PNb_2W_{10}O_{40}$, (b) $H_3PW_{12}O_{40}$ and (c) $H_5PW_9Mo_3O_{440}$ were used to prepare resin salt catalysts by the general procedure used in preparing the catalyst of Example 1.

In each instance, a solution of the heteropoly acid (30 g.) in water (200 ml.) was adjusted to a pH of about 4 by the addition of sodium hydroxide. The solution was equilibrated with the "Amberlite" IRA-400 quaternary ammonium resin (200 ml.) by stirring overnight. The resulting resin salts of heteropoly acids (a), (b), and (c), respectively, when used as catalysts in the epoxidation procedure of Example 1, gave products which were 100%, 99%, and 85% epoxidized.

Heteropoly acids (b) and (c) above are old compounds. Heteropoly acid (a) can be prepared by adding a mixture of 320 parts of aqueous 1 M sodium hydroxide solution, 480 parts of water, 320 parts of aqueous 1 M sodium tungstate solution and 160 parts of aqueous 1 M phosphoric acid solution, to 320 parts of an aqueous solution of 13.4 parts of sodium niobate ($Na_3Nb_6O_{19} \cdot 9H_2O$). The resulting mixture is acidified with 240 parts of aqueous 2 M sulfuric acid solution and boiled for 15 minutes. After cooling, an equal part of concentrated hydrochloric acid is added and the final solution is contacted with diethyl ether. The bottom of the three layers which form is the ether complex of the heteropoly acid. Separation of the ether complex layer from the other layers, followed by removal of the ether by evaporation at reduced pressures leaves the heteropoly acid as a white solid product.

The embodiments of the invention in which an exclusive property or privilege is claimed are defined as follows:

1. In a process for the liquid phase oxidation of a water-soluble ethylenic compound having an electronegatively substituted double bond with hydrogen peroxide in the presence of a metal compound catalyst for the oxidation, the improvement comprising employing as the catalyst an organometallic compound which is insoluble in the reaction mixture and mechanically separating said organometallic compound from said mixture after completion of the oxidation.

2. A process in accordance with claim 1 wherein the organometallic compound is a compound of a metal of the group consisting of tungsten, vanadium, molybdenum, uranium, niobium, and osmium.

3. A process in accordance with claim 2 wherein the organometallic compound is a salt of the metal and a quaternary ammonium anion exchange resin.

4. A process in accordance with claim 2 wherein the organometallic compound is a metal chelate.

5. A process in accordance with claim 3 wherein the organometallic compound is a tungsten compound.

6. A process in accordance with claim 4 wherein the organometallic compound is a tungsten compound.

7. A process in accordance with claim 1 wherein the ethylenic compound is maleic acid and the organometallic catalyst is a tungsten-containing salt of a quaternary ammonium anion exchange resin.

References Cited in the file of this patent

UNITED STATES PATENTS

| | | |
|---|---|---|
| 2,772,296 | Mueller | Nov. 27, 1956 |
| 2,833,787 | Carlson et al. | May 6, 1958 |
| 2,919,283 | Greenspan et al. | Dec. 29, 1959 |
| 2,972,595 | Bavley et al. | Feb. 21, 1961 |
| 2,999,868 | Phillips et al. | Aug. 8, 1961 |
| 3,095,427 | Kelso | June 25, 1963 |

FOREIGN PATENTS

| | | |
|---|---|---|
| 754,359 | Great Britain | Aug. 8, 1956 |
| 837,464 | Great Britain | June 15, 1960 |

OTHER REFERENCES

Payne et al.: Journal of Org. Chem., volume 24, pages 54-55 (1959).